United States Patent
Wang

(10) Patent No.: US 7,672,573 B2
(45) Date of Patent: Mar. 2, 2010

(54) SHARED MEMORY ARCHITECTURE AND METHOD IN AN OPTICAL STORAGE AND RECORDING SYSTEM

(75) Inventor: Tzu-Hsin Wang, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1693 days.

(21) Appl. No.: 10/844,371

(22) Filed: May 13, 2004

(65) Prior Publication Data

US 2005/0254335 A1 Nov. 17, 2005

(51) Int. Cl.
| H04N 7/26 | (2006.01) |
| H04N 7/12 | (2006.01) |
| H04N 7/16 | (2006.01) |
| H04N 7/173 | (2006.01) |
| H04N 9/64 | (2006.01) |
| H04N 9/475 | (2006.01) |
| G06F 3/00 | (2006.01) |
| G06F 13/00 | (2006.01) |
| G06F 13/14 | (2006.01) |
| G06F 13/18 | (2006.01) |
| G06F 13/24 | (2006.01) |
| G06F 13/28 | (2006.01) |
| G06F 15/16 | (2006.01) |
| G06F 15/80 | (2006.01) |
| G06K 9/46 | (2006.01) |

(52) U.S. Cl. ............ 386/111; 345/502; 345/505; 345/519; 345/532; 345/533; 345/535; 345/536; 345/629; 345/630; 348/513; 348/518; 348/718; 348/719; 365/154; 365/232; 375/240.01; 375/240.26; 382/232; 710/39; 710/40; 710/263; 711/151; 711/158; 711/167; 725/131; 725/139; 725/151

(58) Field of Classification Search .......... 386/111, 386/E9.013, E9.052; 345/519, 532, 533, 345/535, 536, 501, 502, 505, 506, 629, 630; 365/232, 154; 375/240.01, E7.027, 240.26, 375/E7.094; 382/232; 704/500; 710/39, 710/40, 263; 711/151, 158, 167; 348/513, 348/518, 718, 719, E5.006, 597, E5.1, E9.039; 725/131, 139, 151; 370/509, 542
See application file for complete search history.

(56) References Cited

U.S. PATENT DOCUMENTS 5,684,804 A * 11/1997 Baronetti et al. ............ 370/509
5,832,304 A * 11/1998 Bauman et al. ................ 710/40

(Continued)

FOREIGN PATENT DOCUMENTS

KR 2001087646 A * 3/2000

*Primary Examiner*—Thai Tran
*Assistant Examiner*—Syed Y Hasan
(74) *Attorney, Agent, or Firm*—Finnegan, Henderson, Farabow, Garrett & Dunner, LLP

(57) ABSTRACT

A system includes an integrated encoder comprising an optical storage controller for coupling to an optical storage medium, and a data encoder for coding input data coupled to the optical storage controller, a first external memory coupled to a first memory controller in the integrated encoder, and a second external memory coupled to a second memory controller in the integrated encoder. In one aspect, the integrated encoder further comprises a first memory arbiter for selectively directing access to the first external memory by the optical storage controller and the data encoder, and a second memory arbiter for selectively directing access to the second external memory by the optical storage controller and the data encoder.

48 Claims, 8 Drawing Sheets

U.S. PATENT DOCUMENTS

| | | | |
|---|---|---|---|
| 5,894,312 A * | 4/1999 | Ishiwata et al. | 345/504 |
| 6,058,459 A * | 5/2000 | Owen et al. | 711/151 |
| 6,137,838 A * | 10/2000 | Miyagoshi et al. | 375/240.26 |
| 6,263,396 B1 * | 7/2001 | Cottle et al. | 710/263 |
| 6,526,583 B1 * | 2/2003 | Auld et al. | 725/139 |
| 6,573,905 B1 * | 6/2003 | MacInnis et al. | 345/629 |
| 6,782,368 B2 * | 8/2004 | Fujii et al. | 704/500 |
| 2002/0030744 A1 * | 3/2002 | Sawachi | 348/207 |
| 2003/0179939 A1 * | 9/2003 | Kim | 382/232 |
| 2004/0257856 A1 * | 12/2004 | Liu | 365/154 |
| 2005/0254335 A1 * | 11/2005 | Wang | 365/232 |

\* cited by examiner

Multiplexer Based Data Selection Unit

Tri-state Based Data Selection Unit

Fig. 6 Data Selection Unit

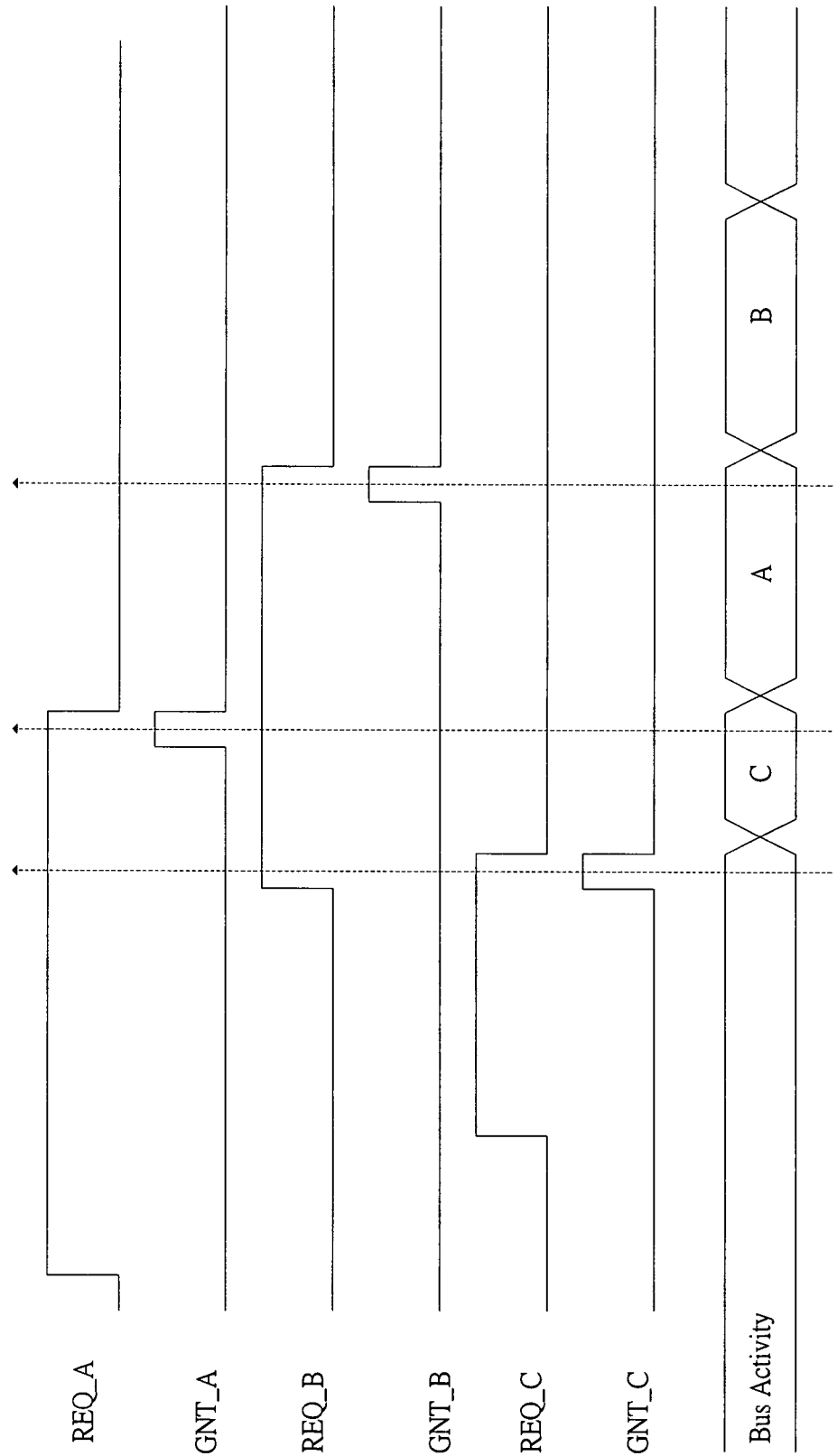
Fig. 7 Possible timing for DRAM / ROM Bus Arbitration

SHARED MEMORY ARCHITECTURE AND METHOD IN AN OPTICAL STORAGE AND RECORDING SYSTEM

BACKGROUND OF THE INVENTION

1. Field of the Invention

The present invention generally relates to optical storage and recording systems and, more particularly, to a shared memory architecture and method in an optical storage and recording system such as a digital video disk rewritable (DVD RW) system.

2. Description of the Related Art

FIG. 1 is a schematic view of a conventional optical storage and recording system 10. System 10 comprises a DVD RW drive 11, a motion picture expert group ("MPEG") encoder subsystem 15, and a television ("TV") decoder subsystem 111. DVD RW drive 11 comprises an optical storage 101, a memory controller such as read only memory (ROM)/flash controller ("Ctlr") 12, a DVD RW controller 13 (coupled to optical storage 101), and another memory controller such as a dynamic random access memory ("DRAM") controller 14. Controller 12 is coupled to DVD RW controller 13, and an external ("Ext") memory such as ROM or flash memory 102. Controller 14 is coupled to DVD RW controller 13, as well as an external memory such as a static dynamic random access memory ("SDRAM") 103. A bus 104 connects DVD RW controller 13 to an MPEG encoder 17 in MPEG encoder subsystem 15.

MPEG encoder subsystem 15 comprises a memory controller such as a ROM/flash controller 16, MPEG encoder 17, and another memory controller such as a DRAM controller 18. Controller 16 is coupled to MPEG encoder 17, and an external memory such as a ROM/flash memory 105. Controller 18 is coupled to MPEG encoder 17, as well as an external memory such as an SDRAM or double rate SDRAM 106. MPEG encoder 17 receives audio data through an audio input 107, and video data through a video input 108 from TV decoder subsystem 111.

TV decoder subsystem 111 comprises a TV decoder 112 and a memory controller such as a DRAM controller 113. Controller 113 is coupled to TV decoder 112, as well as an external memory such as an SDRAM 110. A TV tuner 120 is coupled to TV decoder 112 in TV decoder subsystem 111, as well as an audio analog-to-digital converter 109. As shown in FIG. 1, MPEG encoder 17 and DVD RW controller 13 individually and separately access and manage external memories through their respective memory controllers by providing instructions and data in parallel. Redundancies in memory resources and controller management are disadvantageous in maximizing system efficiency and operability.

There is thus a general need in the art for a system and method overcoming at least the aforementioned shortcomings in the art. A particular need exists in the art for an improved memory architecture and method in an optical storage and recording system overcoming disadvantages with respect to memory resource and controller management redundancies.

BRIEF SUMMARY OF THE INVENTION

Accordingly, an embodiment of the present invention is directed to an optical recorder and system and method that obviate one or more of the problems due to limitations and disadvantages of the related art.

To achieve these and other advantages, and in accordance with the purpose of the present invention as embodied and broadly described, there is provided a system comprising an integrated encoder comprising an optical storage controller for coupling to an optical storage medium, a data encoder for coding input data coupled to the optical storage controller; a first external memory coupled to a first memory controller in the integrated encoder; and a second external memory coupled to a second memory controller in the integrated encoder. In one aspect, the integrated encoder further comprises a first memory arbiter for selectively directing access to the first external memory by the optical storage controller and the data encoder, and a second memory arbiter for selectively directing access to the second external memory by the optical storage controller and the data encoder.

Also in accordance with the present invention, there is provided a processing method in a system having an optical storage medium comprising providing an external memory coupled to an external memory controller, processing optical storage data from the optical storage medium in an optical storage controller, encoding first input data in a data encoder, decoding second input data in a decoder, and selectively directing access to the external memory among the optical storage controller, the data encoder, and the decoder.

Further embodiments consistent with the present invention can include a processing method in a system having an optical storage medium comprising providing a first external memory coupled to a first memory controller, providing a second external memory coupled to a second memory controller, processing optical storage data from the optical storage medium in an optical storage controller, encoding input data in a data encoder, and selectively directing access to the first external memory and the second external memory by the optical storage controller and the data encoder.

In accordance with another embodiment of the present invention, there is provided system including an integrated encoder further comprising an optical storage controller for coupling to an optical storage medium, a data encoder coupled to the optical storage controller, and a decoder for decoding input data coupled to the data encoder; a first external memory coupled to a first memory controller in the integrated encoder; and a second external memory coupled to a second memory controller in the integrated encoder. In one aspect, the integrated encoder further comprises a first memory arbiter for selectively directing access to the first external memory by the optical storage controller and the data encoder, and a second memory arbiter for selectively directing access to the second external memory among the optical storage controller, the data encoder, and the decoder.

In accordance with yet another embodiment of the present invention, there is provided system including an integrated encoder comprising an optical storage controller coupling to an optical storage medium, a data encoder coupled to the optical storage controller, and a decoder for decoding input data coupled to the data encoder; and an external memory coupled to a memory controller in the integrated encoder. In one aspect, the integrated encoder comprises a memory arbiter for selectively directing access to the external memory among the optical storage controller, the data encoder, and the decoder.

In accordance with still another embodiment of the present invention, there is provided system including an integrated encoder comprising an optical storage controller for coupling to an optical storage medium, and a data encoder for coding input data coupled to the optical storage controller; and an external memory coupled to a memory controller in the integrated encoder. In one aspect, the integrated encoder further comprises a memory arbiter for selectively directing access to the external memory by the optical storage controller and the data encoder, and at least one first-in-first-out (FIFO) memory for buffering data between the memory controller and the data encoder.

Additional features and advantages of the present invention will be set forth in part in the detailed description which follows, and in part will be obvious from the description, or may be learned by practices consistent with the present invention. The features and advantages of the present invention will be realized and attained by means of the elements and combinations particularly pointed out in the appended claims.

It is to be understood that both the foregoing general description and the following detailed description are exemplary and explanatory only and are not restrictive of the present invention, as claimed.

The accompanying drawings, which are incorporated in and constitute a part of this specification, illustrate several embodiments of the present invention and together with the description, serve to explain the principles of the present invention.

BRIEF DESCRIPTION OF THE DRAWINGS

FIG. 7 is a timing diagram illustrating an example of memory arbitration timing at memory arbiters consistent with the present invention.

DESCRIPTION OF THE EMBODIMENTS

Reference will now be made in detail to present embodiments of the present invention, examples of which are illustrated in the accompanying drawings. Wherever possible, the same reference numbers will be used throughout the drawings to refer to the same or like parts.

Figure 1:
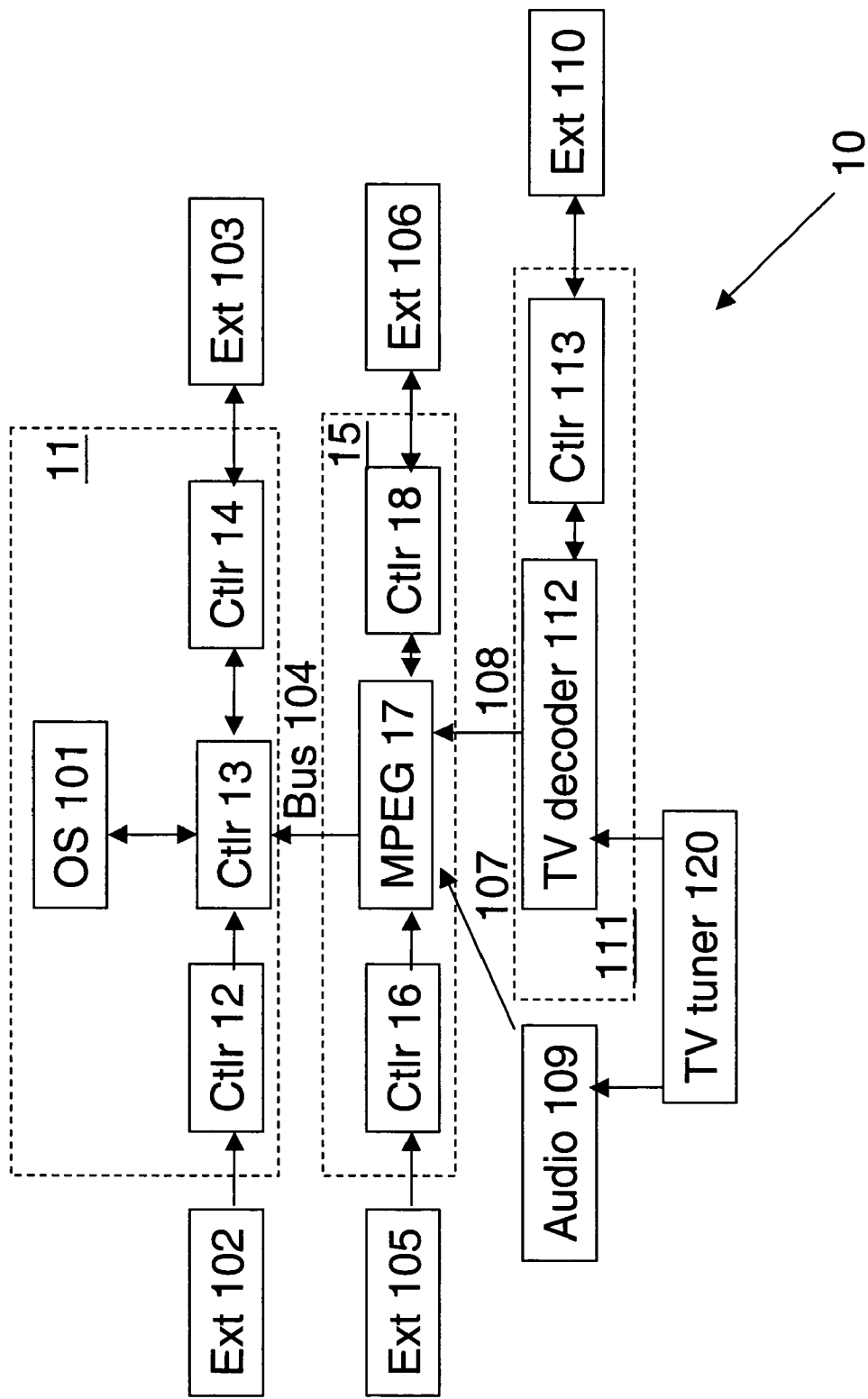
FIG. 1 is a schematic view of a conventional optical storage and recording system having a DVD RW drive and an MPEG encoder subsystem.
Figure 2:
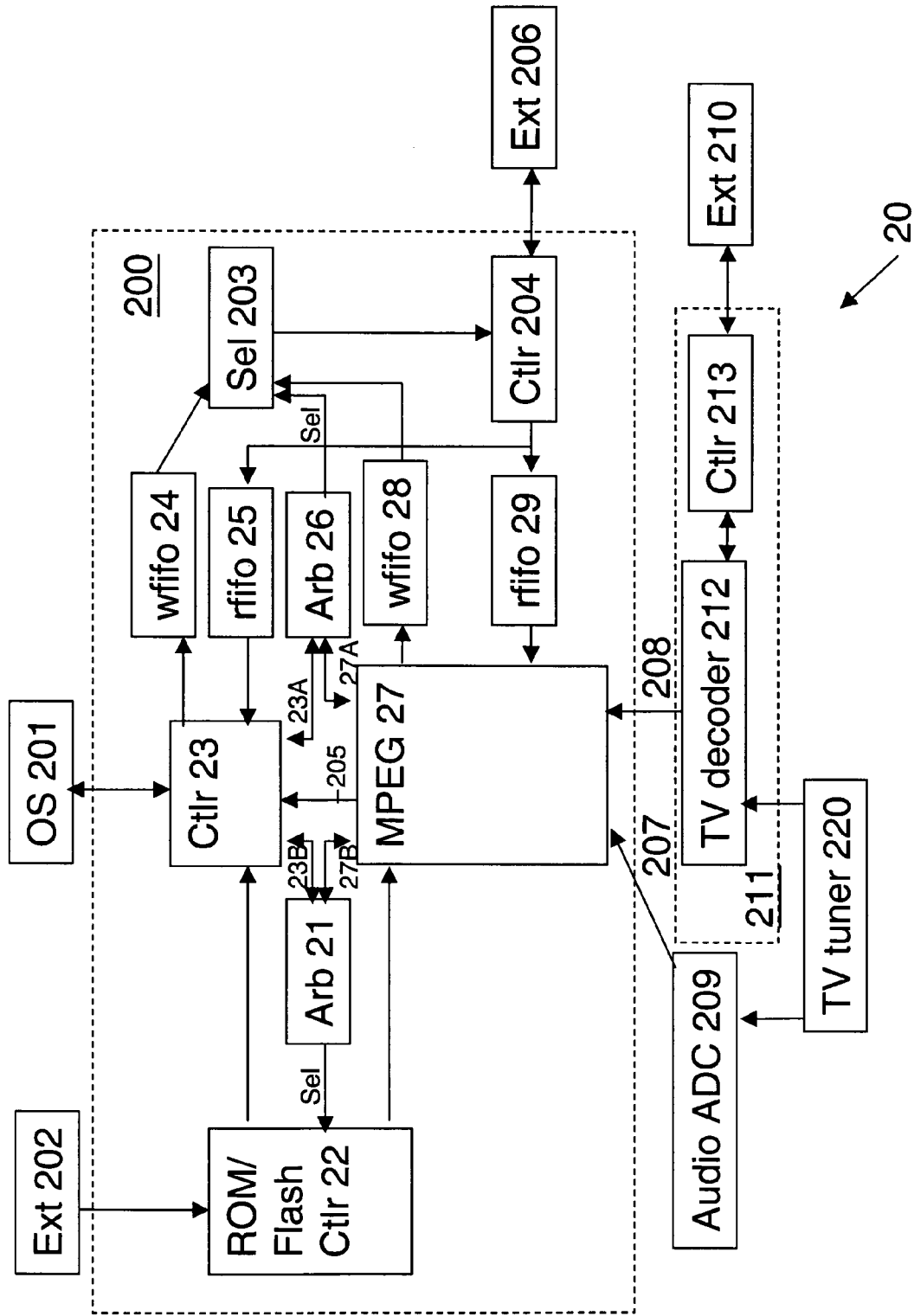
FIG. 2 is a schematic view of an example of an optical storage and recording system having an integrated DVD RW and MPEG encoder consistent with an embodiment of the present invention.

FIG. 2 is a schematic view of an example of an optical storage and recording system 20 having an integrated DVD RW and MPEG encoder 200 consistent with an embodiment of the present invention. Integrated encoder 200 is coupled to an optical storage medium such as a DVD RW optical storage 201, and external memories such as external ROM/flash memory 202 (e.g., 8 or 16 bits) and an SDRAM or double rate SDRAM 206 (e.g., 8, 16, or 32 bits). Integrated encoder 200 comprises a DVD RW controller 23, an MPEG encoder 27, memory arbiters such as a ROM/flash memory arbiter 21 and a DRAM arbiter 26, memory controllers such as a ROM/flash controller 22 and a DRAM controller 204, and a data selection unit 203.

A bus 205 connects DVD RW controller 23 and MPEG encoder 27. MPEG encoder 27 receives audio data through an audio input 207, and video data through a video input 208 from TV decoder subsystem 211. TV decoder subsystem 211 comprises a TV decoder 212 and a memory controller such as a DRAM controller 213. Controller 213 is coupled to TV decoder 212, as well as an external memory such as a SDRAM 210. A TV tuner 220 is coupled to TV decoder 212 in TV decoder subsystem 211, as well as an audio analog-to-digital converter ("ADC") 209.

Integrated encoder 200 further comprises two pairs of first-in-first-out ("FIFO") memories, i.e., a write FIFO 24 and a read FIFO 25 coupled to DVD RW controller 23, and a write FIFO 28 and a read FIFO 29 coupled to MPEG encoder 27. Write FIFOs 24 and 28 are coupled to a data selection unit 203. Read FIFOs 25 and 29 are coupled to a memory controller such as DRAM controller 204, which in turn is coupled to an external memory such as an external SDRAM or a double rate SDRAM, hereinafter referred to as SDRAM 206, in, e.g., 8, 16 or 32 bits.

Figure 8:
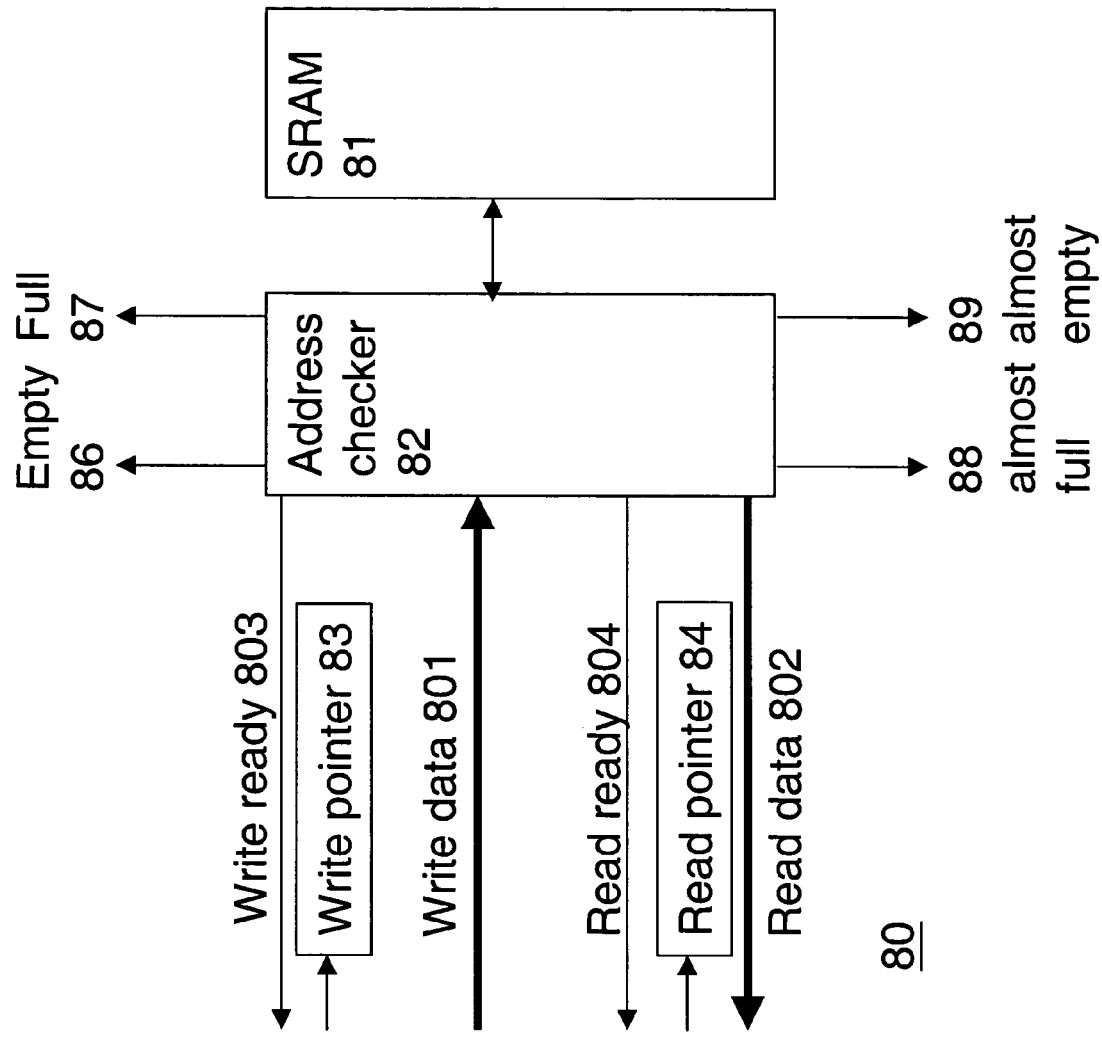
FIG. 8 is a schematic view of an example of a first-in-first-out ("FIFO") memory in an integrated encoder consistent with the present invention.

FIG. 8 is a schematic view of an example of a first-in-first-out memory ("FIFO") 80 in an integrated encoder suitable for implementation as any one of FIFOs 24, 25, 28, or 29. FIFO 80 comprises a static random access memory or SRAM 81, and an address checker 82 for address processing in conjunction with a write pointer 83 and a read pointer 84 with respect to write data 801 and read data 802, respectively. Four signals 86, 87, 88, and 89 from address checker 82 indicate the state of the FIFO, as write data 801 are being input into and read data 802 are being output from address checker 82. If the FIFO is empty, address checker 82 outputs signal 86 indicating that the FIFO is empty. If the FIFO is full, address checker 82 outputs signal 87 indicating that the FIFO is full. If the FIFO is almost full, address checker 82 outputs signal 88 indicating that the FIFO is almost full. If the FIFO is almost empty, address checker 82 outputs signal 89 indicating that the FIFO is almost empty. When the FIFO is ready for a write operation, address checker 82 outputs a write ready signal 803 indicating it is ready for a write operation. When the FIFO is ready for a read operation, address checker 82 outputs a read ready signal 804 indicating it is ready for a read operation.

Referring again to FIG. 2, data selection unit 203 is coupled to receive data from each of write FIFOs 24 and 28 and to provide data to DRAM controller 204 for storage in SDRAM 206. DRAM arbiter 26 is coupled to receive memory access request signals and send memory access grant signals to DVD RW controller 23 and MPEG encoder 27 via control lines 23A and 27A, respectively. Data selection unit 203 is further coupled to receive a select signal "sel" from DRAM arbiter 26 for causing unit 203 to select data from one of write FIFOs 24 or 28 for provision to DRAM controller 204 for writing in SDRAM 206. Data selection unit 203 does not control DRAM controller 204. Rather, DRAM arbiter 26 controls MPEG encoder 27, DVD RW controller 23, and a TV decoder (not shown in FIG. 2). DRAM arbiter 26 provides signals indicating to each bus whether data are read and written into one of read FIFOs 25 and 29.

Thus, DRAM arbiter 26 provides memory arbitration operability to MPEG encoder 27 or DVD RW controller 23 with respect to memory resources through DRAM controller 204. A single memory (such as SDRAM 206) is needed, without requiring additional memory resources. In one aspect of memory arbitration by arbiter 26 consistent with the present invention, MPEG encoder 27 has priority over DVD RW controller 23 in terms of access to memory resources (such as external memory 206). FIFOs 24 and 25 serve as memory buffers between DRAM controller 204 and DVD RW controller 23. Likewise, FIFOs 28 and 29 serve as memory buffers between DRAM controller 204 and MPEG encoder 27.

ROM/flash memory for arbiter 21 is coupled to receive memory access request signals and send memory access grant signals to DVD RW controller 23 and MPEG encoder 27 via control lines 23B and 27B, respectively. Arbiter 21 is further coupled to provide a select "sel" signal to ROM/flash controller 22 to enable access by one of DVD RW controller 23 and MPEG encoder 27 to ROM/flash memory 202.

Thus, ROM/flash arbiter 21 provides memory arbitration operability to MPEG encoder 27 or DVD RW controller 23. A single memory (such as ROM/flash memory 202) is needed, without requiring additional memory resources. In one aspect of memory arbitration by arbiter 21 consistent with the present invention, MPEG encoder 27 has priority over DVD RW controller 23 in terms of access to memory resources (such as external memory 202). Through ROM/flash controller 22, MPEG encoder 27 and DVD RW controller 23 can both utilize the same memory resources of external memory 202.

Bus 205, such as an integrated drive electronics ("IDE") bus, provides connection and interoperability between MPEG encoder 27 and DVD RW controller 23. A serial or parallel interface can also provide interoperability therebetween. In one aspect, interoperability between MPEG encoder 27 and DVD controller 23 can be provided through DRAM controller 204 (and memory resources of external memory 206, if necessary), without utilizing bus 205, or requiring usage of a serial or parallel interface disposed therebetween.

An integrated encoder consistent with the present invention can include a compact disk rewritable (CD RW), or dual-use CD/DVD RW, instead of DVD RW 201 shown in FIG. 2. For example, a CD RW controller can be provided instead of DVD RW controller 23, and a CD RW optical storage instead of DVD RW optical storage 201.

Figure 3:
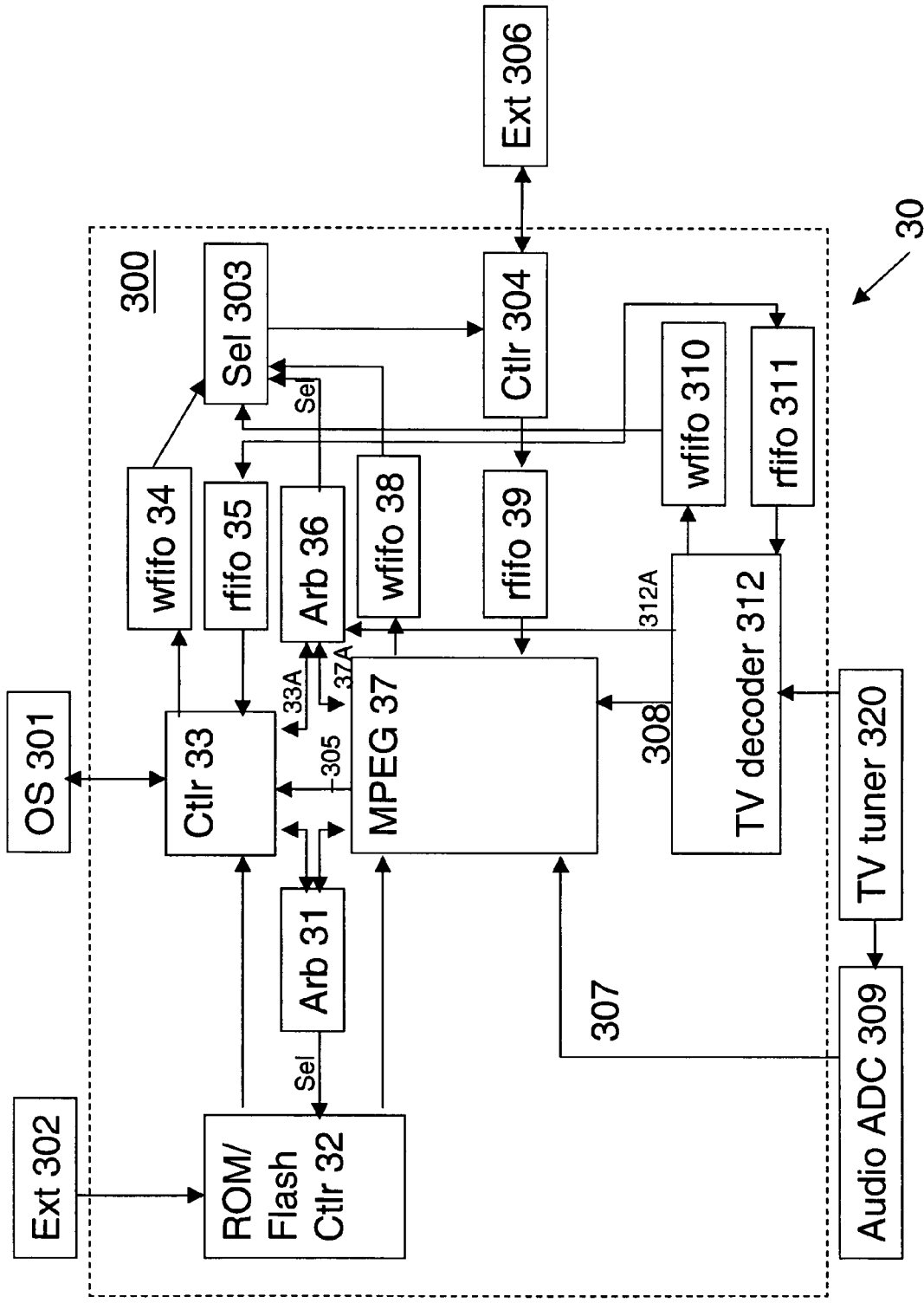
FIG. 3 is a schematic view of another example of an optical storage and recording system having an integrated encoder consistent with an embodiment of the present invention.

FIG. 3 is a schematic view that illustrates another example of an optical storage and recording system 30 having an integrated DVD RW and MPEG encoder 300 consistent with an embodiment of the present invention. Integrated encoder 300 is coupled to an optical storage medium such as a DVD RW optical storage 301, and external memories such as an external ROM/flash memory 302 (e.g., 8 or 16 bits) and an SDRAM or double rate SDRAM 306 (e.g., 8, 16 or 32 bits). Integrated encoder 300 comprises a DVD RW controller 33, an MPEG encoder 37, a TV decoder 312, memory arbiters such as a ROM/flash memory arbiter 31 and a DRAM arbiter 36, memory controllers such as a ROM/flash controller 32 and a DRAM controller 304, and a data selection unit 303. A TV tuner 320 is coupled to TV decoder 312 as well as to an audio ADC 309. Audio ADC 309 is in turn coupled to provide a digital audio input signal to MPEG encoder 37.

A bus 305, such as an integrated drive electronics ("IDE") bus, connects DVD RW controller 33 and MPEG encoder 37. Integrated encoder 300 further comprises three pairs of first-in-first-out ("FIFO") memories, i.e., a write FIFO 34 and a read FIFO 35 coupled to DVD RW controller 33, a write FIFO 38 and a read FIFO 39 coupled to MPEG encoder 37, and a write FIFO 310 and a read FIFO 311 coupled to TV decoder 312. Write FIFOs 34, 38 and 310 are coupled to a data selection unit 303. Read FIFOs 25, 29 and 311 are coupled to a memory controller such as DRAM controller 304, which in turn is coupled to an external memory such as external SDRAM or double rate SDRAM 306 in 8, 16 or 32 bits.

Data selection unit 303 is coupled to receive data from each of write FIFOs 34, 38, and 310 and to provide data to DRAM controller 304 for storage in SDRAM 306. DRAM arbiter 36 is coupled to receive memory access request signals and send memory access grant signals to DVD RW controller 33, MPEG encoder 37, and TV decoder 312 via control lines 33A, 37A and 312A. Data selection unit 303 is further coupled to receive a select signal "sel" from DRAM arbiter 36 for causing unit 303 to select data from one of write FIFOs 34, 38, and 310 for provision to DRAM controller 304 for writing in SDRAM 306. Data selection unit 303 does not control DRAM controller 304. Rather, DRAM arbiter 36 controls MPEG encoder 37, DVD RW controller 33, and TV decoder 312. DRAM arbiter 36 provides signals indicating to each bus whether data are read and written into one of read FIFOs 35 and 39 and 311.

Figure 6B:
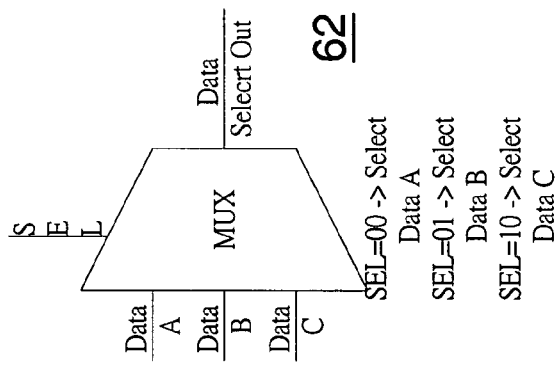
FIGS. 6A and 6B are schematic views of examples of a data selection unit in an optical storage and recording system consistent with the present invention.
Figure 6A:
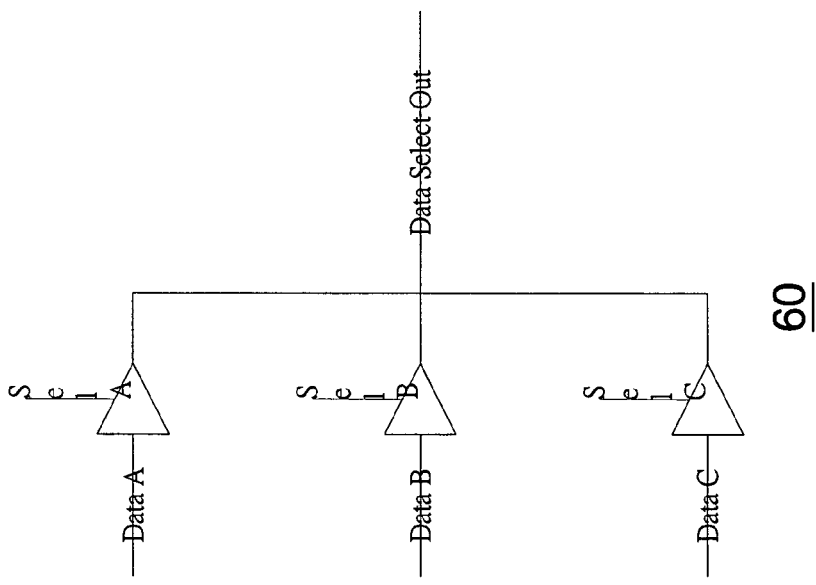

FIGS. 6A and 6B are schematic views of examples of a tri-state data selection unit 60 or a multiplexer selection unit 62, respectively, for use as data selection unit 303 in an optical storage and recording system consistent with the present invention.

For example, data selection by either unit 60 or 62 can be prioritized with respect to data from DVD RW controller 33, MPEG encoder 37, and TV decoder 312, as indicated by data A, B and C. For example, data A, B, and C may be stored in FIFOs 34, 38, and 310, respectively. In tri-state selection unit 60, data A are input into selector A, data B are input into selector B, and data C are input into selector C. After data selection, data select-out is output from one of selectors A, B and C. For data selection by multiplexer selection unit 62, data A, B and C are input into a multiplexer 64 for data selection, which in turn outputs data select-out after data selection therein.

FIG. 7 is a timing diagram that illustrates a selection operation by tri-state selection unit 60 for DRAM or ROM arbitration by arbiters 31 and 36 consistent with the present invention. In FIG. 7, signals REQ_A, REQ_B, and REQ_C are examples of memory access request signals generated by DVD RW controller 33, MPEG encoder 37, and TV decoder 312, respectively, for application to arbiter 36. Arbiter 36 arbitrates among such requests and generates the above noted select signal "sel" based on the result of the arbitration for provision to data selection unit 303. Arbiter 36 also generates a grant signal GNT_A, GNT_B, or GNT_C as a response to the corresponding request signal upon granting the corresponding request.

Thus, DRAM arbiter 36 provides memory arbitration operability to MPEG encoder 37 or DVD RW controller 33 with respect to memory resources through DRAM controller 304. A single memory (such as external memory 306) is needed, without requiring additional memory resources. Access to memory resources (such as external memory 306) can be prioritized among DVD RW controller 33, MPEG encoder 37, and TV decoder 312. FIFOs 34 and 35 serve as memory buffers between DRAM controller 304 and DVD RW controller 33. FIFOs 38 and 39 serve as memory buffers between DRAM controller 304 and MPEG encoder 37. Similarly, FIFOs 310 and 311 serve as memory buffers between DRAM controller 304 and TV decoder 312.

In one aspect, an integrated encoder consistent with the present invention can include a compact disk rewritable (CD RW), or dual-use CD/DVD RW, instead of DVD RW 301 shown in FIG. 3. For example, a CD RW controller can be provided instead of DVD RW controller 33, and a CD RW optical storage instead of DVD RW optical storage 301.

Embodiments consistent with the present invention can include a processing method in a system having an optical storage medium comprising providing an external memory coupled to an external memory controller, processing optical storage data from the optical storage medium in an optical storage controller, encoding input data in a data encoder, decoding the input data in a data decoder, and selectively directing access to the external memory among the optical storage controller, the data encoder, and the data decoder. In one aspect, the method further comprises buffering data between the data encoder and the external memory controller. In another aspect, the method further comprises buffering data from the optical storage controller, and selectively providing the buffered data to the external memory controller. In yet another aspect, the method further comprises buffering data from the decoder, and selectively providing the buffered data to the external memory controller. In still another aspect, the method further comprises buffering the encoded data and the decoded data in at least one first-in-first-out (FIFO) memory.

Further embodiments consistent with the present invention can include a processing method in a system having an optical storage medium, comprising providing a first external memory coupled to a first memory controller, providing a second external memory coupled to a second memory controller, processing optical storage data from the optical storage medium in an optical storage controller, encoding input data in a data encoder, and selectively directing access to the first external memory and the second external memory by the optical storage controller and the data encoder. In one aspect, the method further comprises buffering data between the data encoder and the first external memory controller. In another aspect, the method further comprises buffering data from the optical storage controller, and selectively providing the buffered data to the first external memory controller. In yet another aspect, the method further comprises buffering the optical storage data and the encoded data in at least one first-in-first-out (FIFO) memory. In still another aspect, the method further comprises decoding the encoded data, and providing a third external memory for the decoded data.

Figure 4:
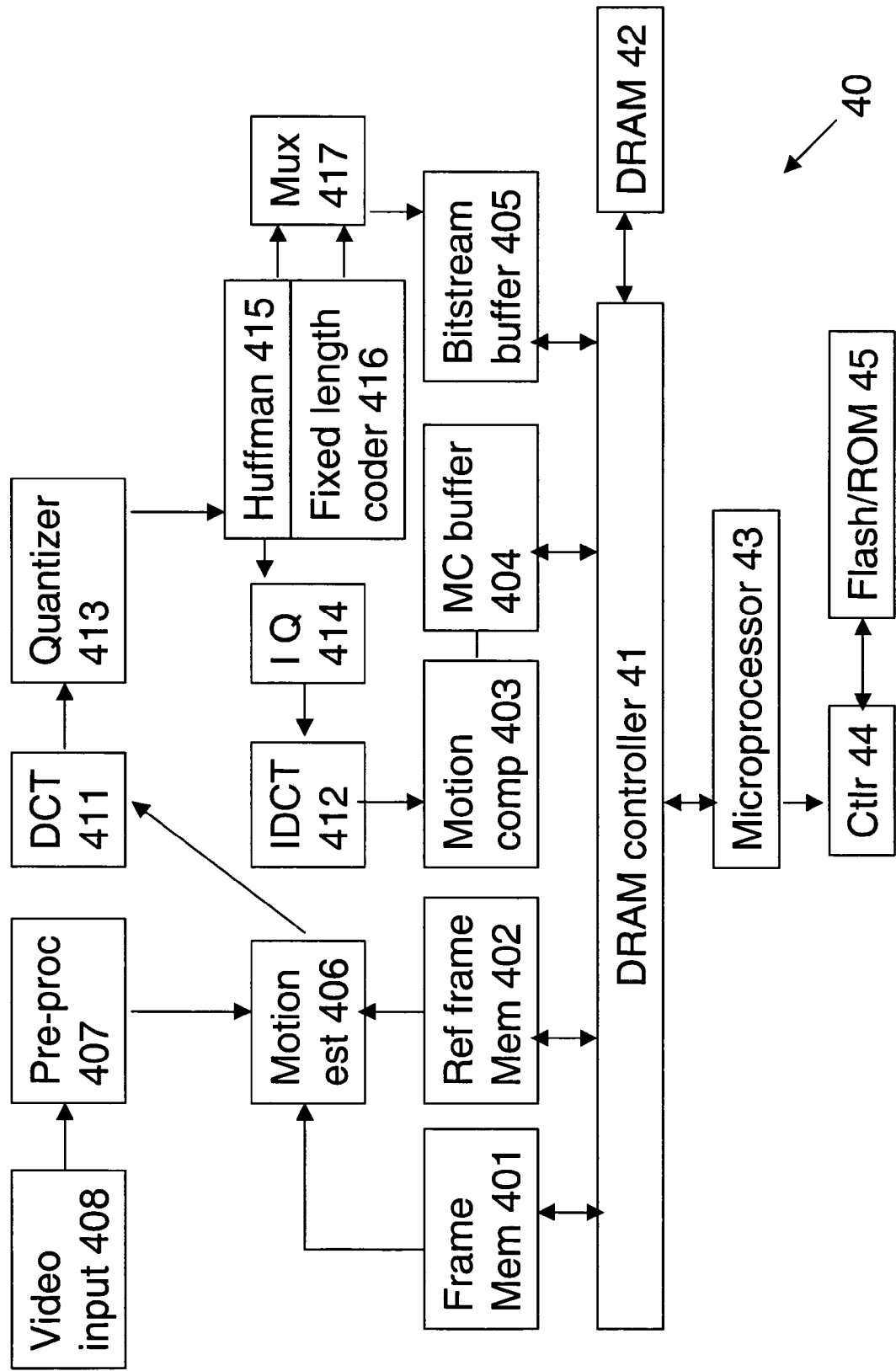
FIG. 4 is a schematic view of an example of an MPEG encoder in an optical storage and recording system consistent with an embodiment of the present invention.

FIG. 4 is a schematic view of an example of an MPEG encoder 40 having a construction generally suitable for implementation as MPEG encoder 27 or 37 in the systems shown in FIGS. 2 and 3. MPEG encoder 40 includes a ROM or flash memory 45. Video data are received from a video input 408 and provided for processing by a pre-processor 407. The pre-processed video data is provided to a motion estimator 406. Motion estimation is performed by motion estimator 406 coupled to both a current frame memory 401 and a reference frame memory 402. Access to a dynamic random access memory (DRAM) 42 is provided through a DRAM controller 41. A microprocessor 43 is coupled to DRAM controller 41. Flash/ROM controller 44, which directs access to flash/ROM 45, is coupled between a microprocessor 43 and flash/ROM 45.

Motion estimator 406 provides processed video data which are subjected to a discrete cosine transformation at a DCT 411, quantized by a quantizer 413, inversely quantized by an inverse quantizer 414, inverse discrete cosine transformed by an IDCT 412, and Huffman coded by a Huffman coder 415. Fixed length coded data from a fixed length coder 416 and Huffman coded data from Huffman coder 415 are multiplexed by a multiplexer 417, and forwarded for bitstream buffering by a buffer 405. Inverse discrete cosine transformed data from IDCT 412 are motion compensated by a motion compensator 403, and then buffered by a motion compensation buffer 404. Access to DRAM 42 is provided through DRAM controller 41.

Figure 5:
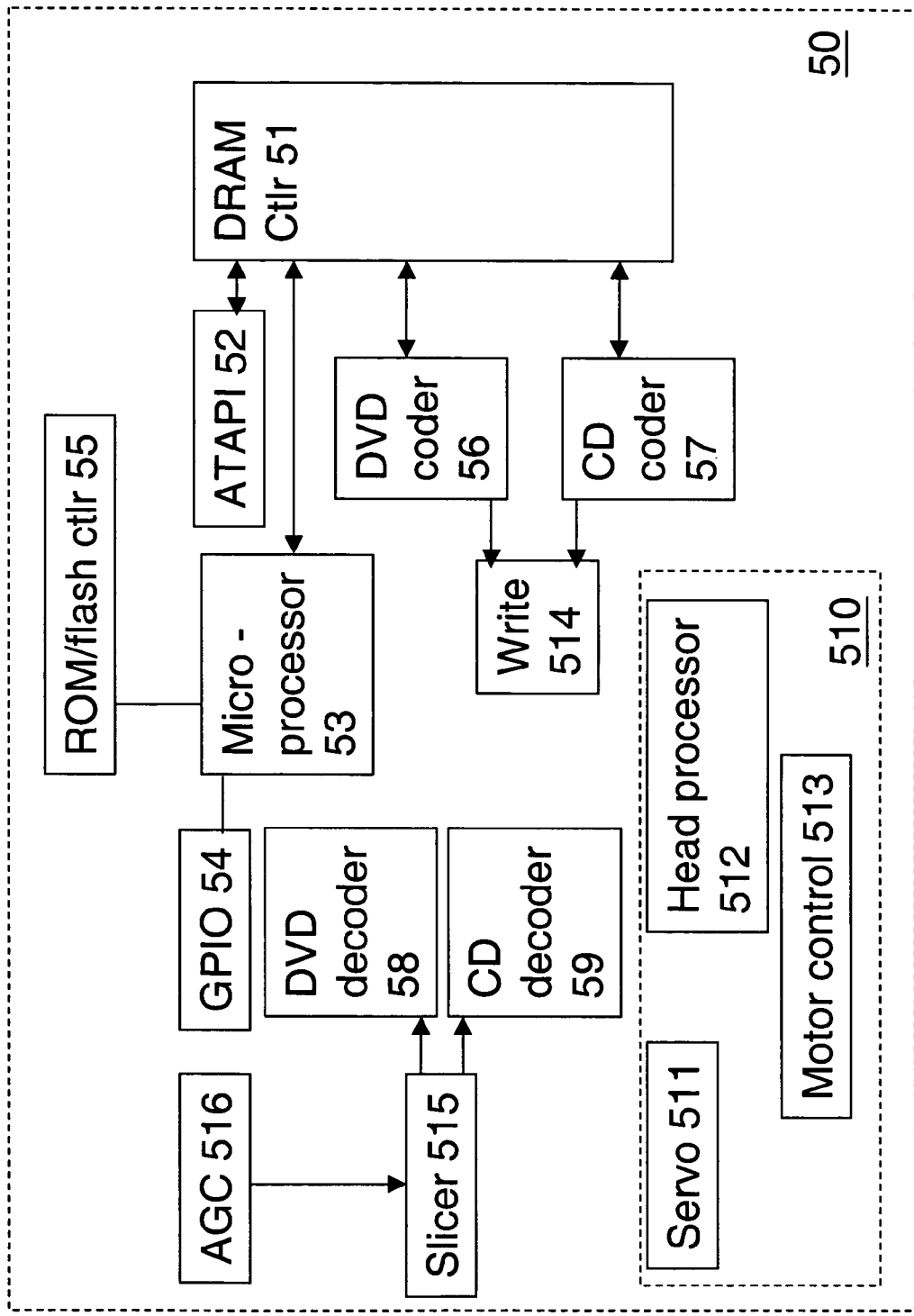
FIG. 5 is a schematic view of an example of an optical storage in an optical storage and recording system consistent with an embodiment of the present invention.

FIG. 5 is a schematic view of an example of an optical storage 50 (such as CD/DVD RW) having a construction generally suitable for implementation as optical storage 201 or 301 in the systems shown in FIGS. 2 and 3. Optical storage 50 comprises an electromechanical portion 510, connected to a CD/DVD RW disk, including a servo 511, a head processor 512, and a motor control 513. Optical storage 500 further comprises a DVD encoder 56 for coding DVD data and a CD encoder 57 for coding CD data. DVD encoder 56 and CD encoder 57 are coupled to a DRAM controller 51 and a write unit 514 for providing respective DVD and CD write instructions. An interface 52, e.g., an advanced technology attachment packet interface (ATAPI) for supporting removable drives, is coupled to DRAM controller 51. Another interface 54, e.g., a general purpose input output ("GPIO"), is coupled to a microprocessor 53 which in turn is connected to a flash/ROM controller 55. A DVD decoder for decoding DVD data and a CD decoder for decoding CD data are coupled to a slicer 515, which is in turn coupled to an equalizer or automatic gain control ("AGC") 516 for data equalization.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

I claim:

1. A system comprising:
    an integrated encoder comprising an optical storage controller for coupling to an optical storage medium, and a data encoder for coding input data coupled to the optical storage controller;
    a first memory controller in the integrated encoder;
    a first external memory coupled to the first memory controller;
    a second memory controller in the integrated encoder;
    a second external memory coupled to the second memory controller; and
    the integrated encoder comprising a first memory arbiter for selectively directing access to the first external memory by the optical storage controller and the data encoder, and a second memory arbiter for selectively directing access to the second external memory by the optical storage controller and the data encoder.

2. The system of claim 1, the integrated encoder comprising a data selection unit coupled to the second memory controller.

3. The system of claim 2, the integrated encoder comprising at least one first-in-first-out (FIFO) memory for buffering data between the optical storage controller and the data selection unit.

4. The system of claim 1, the integrated encoder comprising at least one first-in-first-out (FIFO) memory for buffering data between the second memory controller and the data encoder.

5. The system of claim 1, wherein the input data includes audio data and video data.

6. The system of claim 1 comprising:
    an audio analog-to-digital converter for transmitting audio data to the data encoder;
    a television decoder for transmitting video data to the data encoder; and
    a third memory controller coupled to the television decoder and a third external memory.

7. The system of claim 6 comprising a television tuner coupled to the audio analog-to-digital converter and the television decoder.

8. The system of claim 1, wherein the first external memory comprises at least one of a read only memory and a flash memory.

9. The system of claim 1, wherein the second external memory comprises a dynamic random access memory.

10. The system of claim 1, wherein the data encoder comprises an MPEG encoder and the optical storage controller comprises a DVD RW controller.

11. A system comprising:
an integrated encoder comprising an optical storage controller for coupling to an optical storage medium, a data encoder coupled to the optical storage controller, and a decoder for decoding input data coupled to the data encoder;
a first memory controller in the integrated encoder;
a first external memory coupled to the first memory controller;
a second memory controller in the integrated encoder;
a second external memory coupled to the second memory controller; and
the integrated encoder comprising a first memory arbiter for selectively directing access to the first external memory by the optical storage controller and the data encoder, and a second memory arbiter for selectively directing access to the second external memory among the optical storage controller, the data encoder, and the decoder.

12. The system of claim 11, the integrated encoder comprising a data selection unit coupled to the second memory controller.

13. The system of claim 12, the integrated encoder comprising at least one first-in-first-out (FIFO) memory for buffering data between the optical storage controller and the second memory controller.

14. The system of claim 12, the integrated encoder comprising at least one first-in-first-out (FIFO) memory for buffering data between the decoder and the second memory controller.

15. The system of claim 11, the integrated encoder comprising at least one first-in-first-out (FIFO) memory for buffering data between the second memory controller and the data encoder.

16. The system of claim 11 comprising:
an audio analog-to-digital converter for transmitting audio data to the data encoder; and
a tuner coupled to the audio analog-to-digital converter and the decoder.

17. The system of claim 11 wherein the data encoder is an MPEG encoder and the decoder is a television decoder.

18. The system of claim 11, wherein the first external memory comprises at least one of a read only memory and a flash memory.

19. The system of claim 11, wherein the second external memory comprises a dynamic random access memory.

20. The system of claim 11, wherein the optical storage controller is a DVD RW controller.

21. A system comprising:
an integrated encoder comprising an optical storage controller for coupling to an optical storage medium, a data encoder coupled to the optical storage controller, and a decoder for decoding input data coupled to the data encoder;
a memory controller in the integrated encoder;
a first external memory coupled to the memory controller; and
the integrated encoder comprising a first memory arbiter for selectively directing access to the first external memory by the optical storage controller, the data encoder, and the decoder, and a second memory arbiter for selectively directing access to a second external memory by the optical storage controller, the data encoder, and the decoder.

22. The system of claim 21, the integrated encoder comprising a data selection unit coupled to the memory controller.

23. The system of claim 22, the integrated encoder comprising at least one first-in-first-out (FIFO) memory for buffering data between the optical storage controller and the memory controller.

24. The system of claim 22, the integrated encoder comprising at least one first-in-first-out (FIFO) memory for buffering data between the decoder and the memory controller.

25. The system of claim 21, the integrated encoder comprising at least one first-in-first-out (FIFO) memory for buffering data between the memory controller and the data encoder.

26. The system of claim 21 further comprising:
an audio analog-to-digital converter for transmitting audio data to the data encoder; and
a tuner coupled to the audio analog-to-digital converter and the decoder.

27. The system of claim 21, the external memory comprising a dynamic random access memory.

28. The system of claim 21, the second external memory comprising a read only memory.

29. The system of claim 21 wherein the data encoder is an MPEG encoder and the decoder is a television decoder.

30. A system comprising: an integrated encoder comprising an optical storage controller for coupling to an optical storage medium, and a data encoder for coding input data coupled to the optical storage controller;
a first external memory coupled to a memory controller in the integrated encoder; and
the integrated encoder comprising a first memory arbiter for selectively directing access to the first external memory by the optical storage controller and the data encoder, and at least one first-in-first-out (FIFO) memory for buffering data between the memory controller and the data encoder, and a second memory arbiter for selectively directing access to a second external memory by the optical storage controller and the data encoder.

31. The system of claim 30, the integrated encoder comprising a data selection unit coupled to the memory controller.

32. The system of claim 31, the integrated encoder comprising at least one first-in-first-out (FIFO) memory for buffering data between the optical storage controller and the data selection unit.

33. The system of claim 30, the second external memory comprising a read only memory.

34. The system of claim 30 comprising:
an audio analog-to-digital converter for transmitting audio data to the data encoder;
a television decoder for transmitting video data to the data encoder; and
another memory controller coupled to the television decoder and another external memory.

35. The system of claim 34 further comprising a television tuner coupled to the audio analog-to-digital converter and the television decoder.

36. The system of claim 30, wherein the input data comprises audio data and video data.

37. The system of claim 30, wherein the external memory comprises a dynamic random access memory.

38. The system of claim 30, wherein the data encoder comprises an MPEG encoder and the optical storage controller comprising a DVD RW controller.

39. A processing method in a system including an optical storage medium comprising:
    providing first external memory coupled to an external memory controller;
    processing optical storage data from the optical storage medium in an optical storage controller;
    encoding first input data in a data encoder;
    decoding second input data in a decoder;
    selectively directing access to the first external memory by the optical storage controller, the data encoder, and the decoder with a first memory arbiter and an integrated encoder; and
    selectively directing access to a second external memory by the optical storage controller, the data encoder, and the decoder with a second memory arbiter and the integrated encoder.

40. The method of claim 39 comprising buffering data between the data encoder and the first or second external memory controller.

41. The method of claim 39 comprising:
    buffering data from the optical storage controller; and
    selectively providing the buffered data to the first or second external memory controller.

42. The method of claim 39 comprising:
    buffering data from the decoder; and
    selectively providing the buffered data to the first or second external memory controller.

43. The method of claim 39 comprising buffering the encoded data and the decoded data in at least one first-in-first-out (FIFO) memory.

44. A processing method in an optical storage medium comprising:
    providing a first external memory coupled to a first memory controller;
    providing a second external memory coupled to a second memory controller;
    processing optical storage data from the optical storage medium in an optical storage controller;
    encoding input data in a data encoder; and
    selectively directing access to the first external memory by the optical storage controller and the data encoder with a first memory arbiter and an integrated encoder; and
    selectively directing access to the second external memory by the optical storage controller and the data encoder with a second memory arbiter and the integrated encoder.

45. The method of claim 44 comprising buffering data between the data encoder and the first external memory controller.

46. The method of claim 44 comprising:
    buffering data from the optical storage controller; and
    selectively providing the buffered data to the first external memory controller.

47. The method of claim 44 comprising buffering the optical storage data and the encoded data in at least one first-in-first-out (FIFO) memory.

48. The method of claim 44 comprising:
    decoding second input data; and
    providing a third external memory for the decoded second input data.

* * * * *